Nov. 10, 1925. Re. 16,206
F. E. BEARDEN
HEDDLE SPACER INSERTING MACHINE
Original Filed June 27, 1919 2 Sheets-Sheet 1
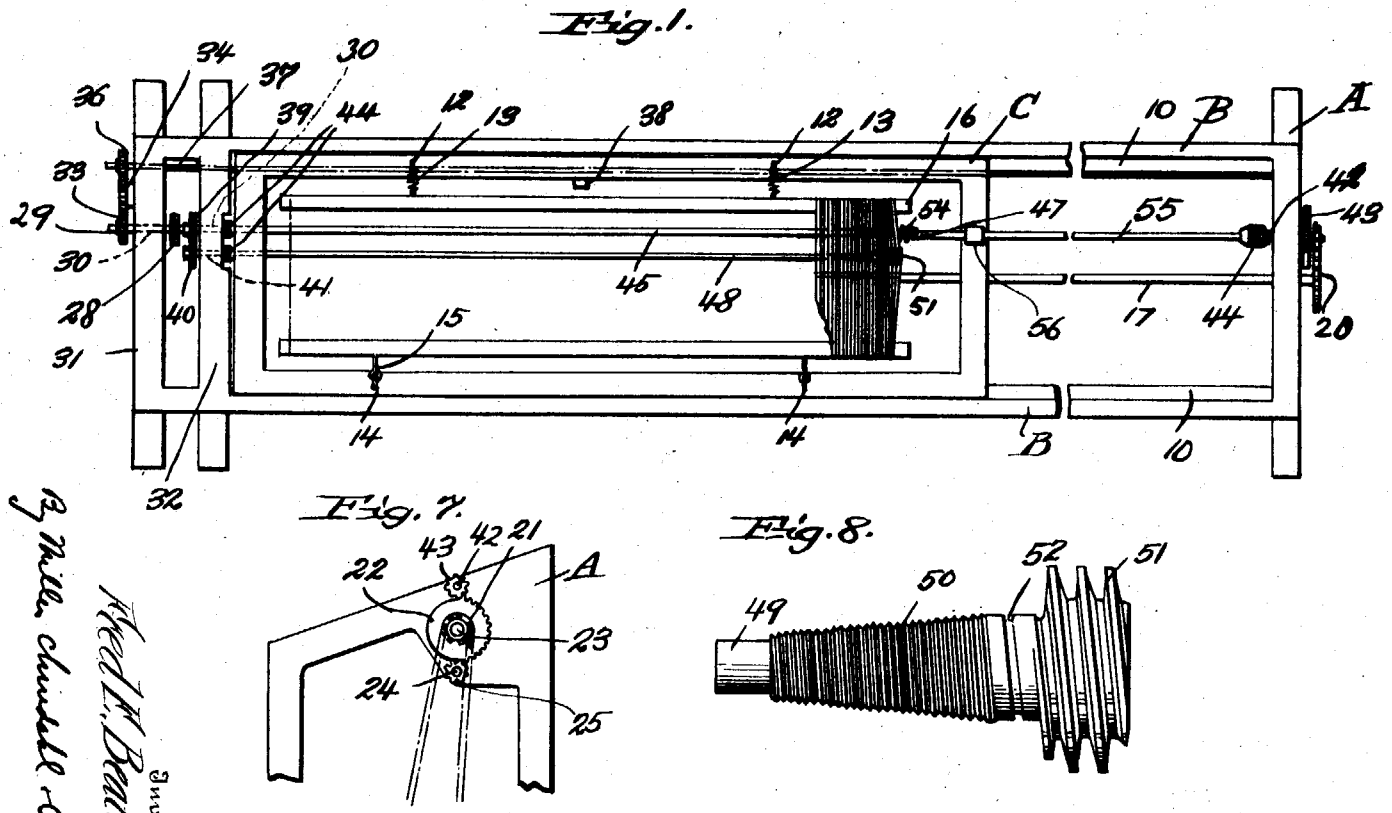
Inventor
Fred E. Bearden
By Miller, Chindahl & Parker
Attorneys Nov. 10, 1925. Re. 16,206
F. E. BEARDEN
HEDDLE SPACER INSERTING MACHINE
Original Filed June 27, 1919 2 Sheets-Sheet 2
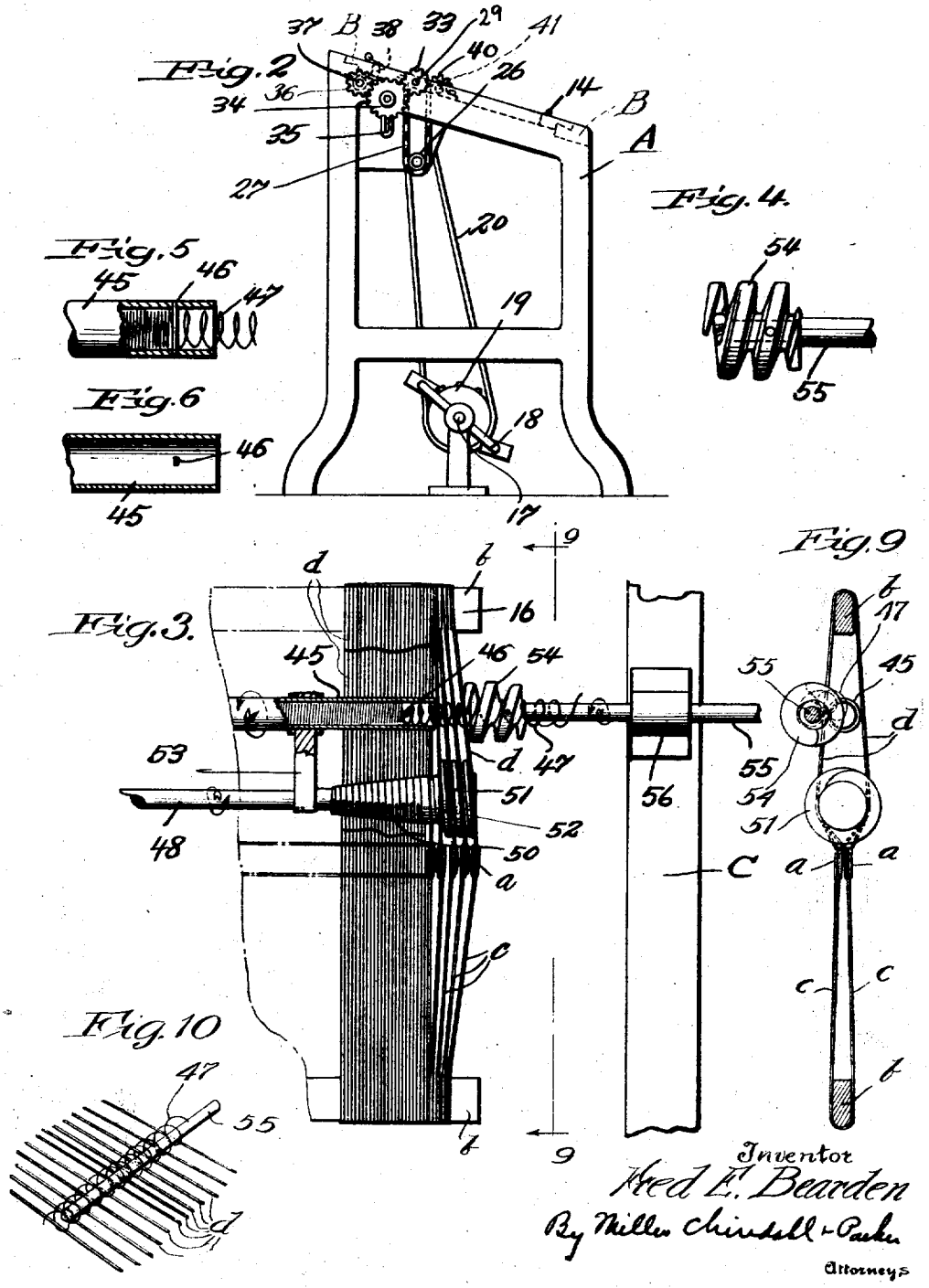
Inventor
Fred E. Bearden
By Miller Chidsell & Parker
Attorneys Reissued Nov. 10, 1925. Re. 16,206

UNITED STATES PATENT OFFICE.

FRED E. BEARDEN, OF SPARTANBURG, SOUTH CAROLINA, ASSIGNOR, BY MESNE ASSIGNMENTS, TO BARBER-COLMAN COMPANY, OF ROCKFORD, ILLINOIS, A CORPORATION OF ILLINOIS.

HEDDLE-SPACER-INSERTING MACHINE.

Original No. 1,339,313, dated May 4, 1920, Serial No. 307,046, filed June 27, 1919. Application for reissue filed August 22, 1921. Serial No. 494,385.

*To all whom it may concern:*

Be it known that I, FRED E. BEARDEN, a citizen of the United States, residing at Spartanburg, in the county of Spartanburg and State of South Carolina, have invented certain new and useful Improvements in Heddle-Spacer-Inserting Machines, of which the following is a specification.

Warp-drawing machines of the class now on the market are provided with worms or screws arranged to pass through coiled springs engaging the heddles of the cotton harnesses through which the warp is to be drawn. The springs referred to extend across the width of the harness, each helix or spire engaging a heddle. Control of the heddles by the worm or screw is obtained through the medium of the spring. Heretofore these springs have been manually applied to the harnesses. The object of this invention is to produce a machine for automatically associating such a spring with the heddles of the harness.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

Referring to the accompanying drawings, Figure 1 is a top plan view of a machine constructed in accordance with the invention, showing a harness mounted therein with certain of the heddles in spaced relation to each other as effected by the spacing and positioning mechanism of the machine.

Fig. 2 is an end elevation of the machine.

Fig. 3 is an enlarged fragmentary plan view showing in detail the spacing and positioning of the heddles of the harness, certain parts of the mechanism being shown partly in section.

Fig. 4 is a detail view of the helical screw or spacing worm.

Fig. 5 is a fragmentary elevation of the tubular shaft or member containing the coiled spring, the tubular shaft or member being partly in section.

Fig. 6 is a fragmentary sectional view taken longitudinally through the center of the tubular shaft or member.

Fig. 7 is a fragmentary elevation of the end of the machine opposite to that shown in Fig. 2.

Fig. 8 is a detail view of the heddle spacing and positioning screws.

Fig. 9 is a view taken in the plane of line 9—9 of Fig. 3.

Fig. 10 is a fragmental perspective view showing how the coiled spacer spring, the heddles and the shaft 55 are associated by the machine.

Similar reference characters indicate corresponding parts throughout the several views in the drawings.

Referring to the drawings in detail, A designates generally the frame of the machine, which may be of any suitable form and character and which supports spaced parallel longitudinally disposed track rails B upon which the harness-supporting carriage C travels. The rails B are formed at their inner edges for the major portion of their length with rabbets 10 which constitute ways for the rabbetted edges of the side bars or rails of the carriage C, so that in this manner the latter is prevented from any lateral displacement in the longitudinal travel thereof in the ways in the track rails B.

The top portion of the frame A of the machine is forwardly inclined and also the carriage C supported thereon is likewise inclined for the convenience of the operator of the machine. Mounted in the side rail of the carriage C at the elevated side thereof are spaced eyes 12 to which are connected coiled rectractile springs 13, while mounted in the other side rail of said carriage C are spaced hooks 14 on which are detachably engaged the screw eyes 15, the same being fixed in the harness 16 which has also connected thereto the coiled retractile springs 13 and in this manner the harness 16 is supported in the carriage C in order that it may not be held too rigidly for most efficient operation thereon.

Arranged within the frame A in the lower portion thereof and supported in any suitable manner is a main power or driving shaft 17 which is disposed preferably approximately medially of the frame and extends longitudinally thereof, the said shaft 17 being in this instance formed with pedals 18 for rotation thereof by the operator of the machine. However, it is to be understood that the shaft 17 may be mechanically driven through the medium of a motor or other suitable source of power (not shown). On one end of the shaft 17 is fixed a sprocket wheel 19 over which is trained a sprocket chain 20, the chain being also trained over a sprocket pinion 21 (Fig. 7) formed on and integral with a mutilated gear 22 journaled upon a stub shaft 23 fixed in one end of the frame A near the upper portion thereof. Journaled in suitable bearings in the frame A at the upper portion thereof below the carriage C is a driven or countershaft 24 which extends longitudinally of the frame A and has fixed to one end thereof a pinion 25 with which the teeth of the multilated gear 22 are adapted to mesh. The driven shaft 24 at its opposite end has fixed thereto a sprocket gear 26 (Fig. 2) over which is trained an endless sprocket chain 27. The chain 27 is also trained over a sprocket gear 28 fixed to a short shaft 29 disposed longitudinally in the frame A and journaled in bearings 30 mounted upon spaced parallel transverse bars 31 and 32 respectively at one end of the frame. The short shaft 29 projects at its outer end beyond the adjacent end of the frame and has fixed thereto a pinion 33 meshing with an adjustable idle gear 34 supported upon a hanger 35 suitably adjustably mounted on the frame A. The gear 34 meshes with a pinion 36 fixed to the outer end of a feed screw shaft 37 which is suitably journalled in the frame A beneath the carriage C longitudinally of said frame A, the carriage C being fitted with a depending connecting element 38 to engage in the thread of the feed screw shaft 37, so that on the rotation of the latter the carriage C will be advanced upon the track rails 10 longitudinally of the machine from one end of the frame A to the other thereof.

Fixed to the shaft 29 is a gear 39 (Fig. 1) with which meshes a companion gear 40 fixed to one end of a stub shaft 41 which is arranged parallel with the short shaft 29 and mounted in the bearing 30 therefor. Suitably journalled in the frame A opposite the short shaft 29 is a stub shaft 42 having fixed to the outer end thereof a pinion 43 with which the teeth of the mutilated gear 22 are adapted to mesh.

On the inner end of the short shaft 29 and the stud shafts 41 and 42 are mounted detachable coupling elements 44 for the detachable fastening of the spacer and positioning mechanism hereinafter fully described.

The spacer and positioning mechanism comprises a spacer-spring container and feeder tube 45 which is removably mounted in the carriage C with one end fastened in the coupling 44 on the short shaft 29, the tube 45 being preferably of the length shown in Fig. 1 of the drawings. This tube 45 is adapted to receive therein a coiled spring of suitable length. Mounted within the tube 45 near the inner end thereof is a feed pin 46 which is adapted to engage between the coils of the spring 47 as is clearly shown in Fig. 5 of the drawings, so that on the rotation of the tube 45 in the working of the machine the spring 47 will be fed from the tube in a uniform manner for a purpose presently described.

Detachably connected to the stub shaft 41 through the medium of the coupling 44 is a driving rod 48 which is arranged parallel with the tube 45 and is coextensive therewith. The rod 48 on the inner end thereof carries a heddle feed screw or worm 49 which serves to act upon the cords supporting the heddle eyes to space the said cords in successive order during the travel of the carriage C in one direction. The worm or screw 49 is formed with a tapered threaded end portion 50 and a relatively heavy opposite screw end 51 having the required pitch to assure the requisite spacing of the cords of the harness in the operation of the machine. Intermediate the tapered threaded end 50 and the screw end 51 of the worm of screw 49 is a grooved hub portion 52 which directs the heddle cords from the tapered threaded end 50 into the spaces between the threads of the screw end 51 of said worm or screw 49 on the rotation thereof.

Detachably connecting the tube 45 and the rod 48 in their spaced parallel relation to each other is a spacer yoke or clip 53 which forms a bearing for said tube and rod and prevents either the tube or the rod from sagging one relative to the other within the harness during the operation of the machine.

Th heddle-placing worm comprises a helical screw or augerlike head 54 which is mounted upon the inner end of a rod 55 detachably journalled in a bearing 56 on the carriage C and having its outer end detachably fastened in the coupling 44 of the stub shaft 42. The rod 55 and the tube 45 are in the same plane, but, as best shown in Fig. 9, they are not axially alined. The heddle-placing worm constituted by the helical screw or augerlike head 54 is located adjacent to the open delivery end of the tube 45 in position to engage the coils of the spring 47, as is clearly shown in Figs. 3 and 9 of the drawings.

It may conduce to a clear understanding of the operation of the machine to explain that in a standard cotton harness each eye *a* (Fig. 9) is connected to one of the harness shafts *b* by a double cord *c*, and to the other shaft by two cords *d* that pass to opposite sides of the shaft. The function of the machine is to associate the spring 47 with one of the cords *d* of each eye, successive cords *d* being laid between successive spires of the spring.

As shown in Fig. 9, the eyes *a* are disposed in two banks or series. One of the cords *d* upon which the machine operates extends from an eye in one series, the next adjacent cord extends from an eye in the other series, and so on. Thus by associating the spring with the cords *d* at one side of the harness all of the eyes are brought under control.

In use, the carriage C is placed at the left-hand end of the machine and a harness 16 is hung upon the carriage C through the medium of the screw eyes 15 and the springs 13. Thereafter the tube 45 and the rod 48 are passed between the cords *d* and the tube 45 and the rod 48 are coupled through the medium of the couplings 44 with the short shaft 29 and the stub shaft 41, respectively. It is, of course, understood that the helical spring 47 has been previously placed within the tube 45 and a few coils of said spring 47 extended through the delivery end of the tube 45 to be exposed without the same. The rod 55 carrying the spacer worm constituted by the screw or augerlike head 54 is mounted in the bearing 56 on the carriage C and "screwed" into a few of the exposed coils of the spring 47. The rod 55 is then secured in the coupling 44 on the stub shaft 42. When power is applied to drive the machine, the spacer worm 54 "screws" its way through the coiled spring and spreads the coils apart for the reception of the cords *d*. The cords *d* extending to opposite sides of the upper harness shaft are spread apart by the tapering screw-threaded portion 50 and thereby placed under increased tension. The cords *d* at the upper side of the harness are fed forward by the screw 50 to the screw 51. The latter spaces the cords *d* apart so that they can be picked up by the free end or point of the screw 54. As the screw 54 revolves, it passes the cords *d* along beneath it, thereby laying a cord *d* between every two coils of the spring. As the carriage C advances, the cords *d* pass along beneath the rod 55, said rod serving to retain the spring in proper association with the cords *d*. In the rotation of the tube 45 the pin 46 serves to feed the spring 47 to the spacer worm 54. The helical feed worm 51, the heddle-placing worm 54, and the spring feeder 45 rotate intermittently, thus giving the operator time to see that said worms are functioning properly. When the entire harness has been fed past the spacer worm 54, the rod 55 is detached from the coupling 44 and withdrawn from the spring 47, a retaining cord (not shown) being substituted as the rod is being withdrawn. The harness is then removed from the machine.

The machine as shown and described operates to insert a left-hand spacer spring in the harness, but it will be understood that by reversing the direction of rotation of the operating elements and using operating elements of the opposite hand, a right-hand spring may be inserted in the harness.

Changes, variations and modifications are contemplated in the invention within the scope of the appended claims, without departing from the spirit of the invention or sacrificing any of its advantages. As heretofore stated, the machine can be operated by mechanical power in lieu of manual operation.

Should any of the supporting cords *d* for the heddle eyes be twisted or disarranged in the harness when the said cords move from the screw 50 onto the hub 52 of the spacing worm or screw, the operator of the machine can readily observe the twisted character of the cords and through the instrumentality of a suitable tool or the finger of the operator he can readily straighten the cord to assure accuracy in the successive spacing of the supporting cords.

What is claimed is:

1. A machine for inserting a helically-coiled wire between the cords of a harness comprising means to support the harness, a helical screw or worm, a feed member for a helically coiled wire, means active upon the helically coiled wire for opening the coils successively, and means for spreading the supporting cords of the heddle eyes of the harness and positioning the same relative to the first named means for the automatic placing of the eye supporting cords successively thereby in the helices of the coiled wire.

2. A machine for inserting a normally-contracted extensible spacing member between the harness-eye supports of a harness comprising means to support the harness, a spacing member adapted to engage the harness eye supports for successively spreading the same apart, means for feeding a normally contracted extensible spacing member, and a placing member active upon the contracted extensible spacing member and placing the harness eye supports therein.

3. A machine for inserting a normally-contracted extensible spacing member between the harness-eye supports of a harness comprising a spacing member adapted to engage the harness eye supports for successively spreading the same apart, means for feeding a normally contracted extensible spacing member, and a placing member active upon the contracted extensible spacing member and placing the harness eye supports therein, and a movable carriage for the harness.

4. A machine for inserting a normally-contracted extensible spacing member between the harness-eye supports of a harness comprising a spacing member adapted to engage the harness eye supports for successively spreading the same apart, means for feeding a normally contracted extensible spacing member, a placing member active upon the contracted extensible spacing member and placing the harness eye supports therein, a movable carriage for the harness, and a mechanism for actuating the feed means for the contracted extensible spacing member and the spacing and placing means.

5. A machine of the character described comprising a support having a track, a carriage movable over the track, a feeder removably supported in the carriage and adapted to contain a coiled spring, means for mounting a harness upon the carriage, heddle-spacing means removably mounted on the carriage, and means for spreading the coils of the spring when fed from the feeder and placing the heddles successively in the coils and detachably mounted upon the carriage.

6. A machine of the character described comprising a support having a track, a carriage movable over the track, a coiled spring feeder removably supported in the carriage and adapted to contain a helical spring, means for mounting a harness upon the carriage, heddle-spacing means removably mounted on the carriage, and means for spreading the coils of the spring when fed from the feeder and placing the heddles successively in the coils and detachably mounted upon the carriage, and mechanism for synchronously operating the feeder and the spreading and placing means.

7. A machine of the character described comprising a support having a track, a carriage movable over the track, a coiled spring feeder removably supported in the carriage and adapted to contain a helical spring, means for mounting a harness upon the carriage, heddle-spacing means removably mounted on the carriage, and means for spreading the coils of the spring when fed from the feeder and placing the heddles successively in the coils and detachably mounted upon the carriage, mechanism for synchronously operating the feeder and the spreading and placing means, and feed means cooperating with the last named mechanism for imparting movement to the carriage.

8. A heddle-spacer-inserting machine having, in combination, means to support a harness, means whereby the heddle cords of said harness are automatically and successively spaced, and means for successively placing the spaced cords in a heddle spacer.

9. A heddle-spacer-inserting machine having, in combination, means for placing heddle cords between the spires of a coiled spring, and means for yieldingly supporting a harness for operation thereon by said placing means.

10. In a machine for inserting a spring into a harness, a rotary tube to contain the spring, said tube having fixed thereto a transverse pin to feed the spring out of the tube, and a rotary screw adjacent to the discharge end of the tube to engage the coils of said spring.

11. A spring-inserting machine having, in combination, means for supporting a harness, a tube to contain the spring, and means to support the tube lengthwise of and within the harness, said tube extending between the cords *d* of said harness substantially as described.

12. A spring-inserting machine having, in combination, means for supporting a harness, means for tensioning and spreading the cords *d* of said harness, a screw for successively engaging the spread cords, and means for supporting a coiled spring in position to be entered by said screw.

13. A machine for inserting a coiled spring into a harness (said harness comprising two shafts *b*, heddle eyes *a*, cords connecting said eyes to one of said shafts, and each of said eyes having two cords *d* that pass to opposite sides of the other shaft), said machine having, in combination, means to support such a harness, a tube to contain a coiled spring, said tube being supported for rotation between the two series of cords *d*, a unitary heddle-handling element comprising a tapered spirally-grooved portion and a cylindrical spirally-grooved portion, said element being supported for rotation between the two series of cords *d* and between said tube and the heddle eyes, said element serving to space the cords *d* apart, and a screw supported for rotation at one side of the harness and in proximity to the end of said tube to place said spring and the spaced cords *d* in engagement with each other.

14. A machine for inserting a coiled spring into a harness (said harness comprising two shafts *b*, heddle eyes *a*, cords connecting said eyes to one of said shafts, and each of said eyes having two cords *d* that pass to opposite sides of the other shaft), said machine having, in combination, means to support such a harness, a device to contain and feed a coiled spring, said device being supported between the two series of cords *d*, a heddle-handling element supported between the two series of cords *d* and between said device and the heddle eyes, said element serving to space the cords *d* apart, and a screw supported for rotation at one side of the harness and in proximity to the end of said device to place said spring and the spaced cords *d* in engagement with each other.

15. A machine for inserting a coiled spring into a harness (said harness comprising two shafts *b*, heddle eyes *a*, cords connecting said eyes to one of said shafts, and each of said eyes having two cords *d* that pass to opposite sides of the other shaft), said machine having, in combination, means to support such a harness, a tube to contain and feed a coiled spring, said tube being supported for rotation between the two series of cords *d*, a heddle-handling element supported between the two series of cords *d* and between said tube and the heddle eyes, said element serving to space the cords *d*, apart, and a screw supported for rotation in proximity to the end of said tube to place said spring and the spaced cords *d* in engagement with each other.

16. A machine for inserting a coiled spring into a harness (said harness comprising two shafts *b*, heddle eyes *a*, cords connecting said eyes to one of said shafts, and each of said eyes having two cords *d* that pass to opposite sides of the other shaft), said machine having, in combination, means to support such a harness, a tube to contain and feed a coiled spring, said tube being supported for rotation between the two series of cords *d*, a heddle-handling element supported for rotation between the two series of cords *d* and between said tube and the heddle eyes, said element serving to space the cords *d* apart, and means in proximity to the end of said tube to place said spring and the spaced cords *d* in engagement with each other.

17. The combination of means to support a loom harness (said harness comprising a shaft *b* and eyes *a*, each eye having two series of cords *d* that pass to opposite sides of said shaft) and a worm supported for rotation between the cords *d* that pass to one side of the shaft *b* and those that pass to the other side of said shaft, said worm serving to space said cords apart.

18. The combination of means to support a loom harness (said harness comprising a shaft *b* and eyes *a*, each eye having two series of cords *d* that pass to opposite sides of said shaft) and a cord-spacing element supported for rotation between the cords *d* that pass to one side of the shaft *b* and those that pass to the other side of said shaft, said element having a tapered screw-threaded leading end and a relatively heavy screw-threaded following end.

In testimony whereof I hereunto affix my signature at Spartanburg, in the county of Spartanburg, and State of South Carolina, United States of America, this 8th day of Aug., 1921.

FRED E. BEARDEN.